(12) United States Patent
Nicholson

(10) Patent No.: US 8,932,091 B2
(45) Date of Patent: *Jan. 13, 2015

(54) PROPULSION SYSTEM

(76) Inventor: Hugh B. Nicholson, Tallahassee, FL (US)

(*) Notice: Subject to any disclaimer, the term of this patent is extended or adjusted under 35 U.S.C. 154(b) by 676 days.

This patent is subject to a terminal disclaimer.

(21) Appl. No.: 13/243,032

(22) Filed: Sep. 23, 2011

(65) Prior Publication Data

US 2012/0011828 A1     Jan. 19, 2012

Related U.S. Application Data

(63) Continuation-in-part of application No. 12/071,455, filed on Feb. 21, 2008, now Pat. No. 8,437,443.

(60) Provisional application No. 60/996,895, filed on Dec. 10, 2007.

(51) Int. Cl.
*F02K 1/12* (2006.01)
*F02K 3/075* (2006.01)
*B63H 5/15* (2006.01)
(Continued)

(52) U.S. Cl.
CPC *F02K 3/075* (2013.01); *B63H 5/15* (2013.01); *B63H 11/08* (2013.01); *B63H 11/107* (2013.01); *B63H 2001/165* (2013.01); *B63H 2011/081* (2013.01); *B63H 2023/005* (2013.01)
USPC .............................................. 440/38; 440/47

(58) Field of Classification Search
USPC ........... 440/38, 47, 48; 60/221; 416/176, 177, 416/90 A, 93 A; 415/208.2, 77
See application file for complete search history.

(56) References Cited

U.S. PATENT DOCUMENTS 3,249,083 A   5/1966   Irgens
4,838,819 A   6/1989   Todorovic
(Continued)

FOREIGN PATENT DOCUMENTS

CN   2646040 Y   10/2004
CN   1655984 A   8/2005
(Continued)

OTHER PUBLICATIONS

The first Office Action, dated Jun. 21, 2012, and English translation thereof in corresponding Chinese Application No. 2008801259980. pp. 15 (including english translation).
(Continued)

*Primary Examiner* — Edwin Swinehart
(74) *Attorney, Agent, or Firm* — Maier & Maier, PLLC

(57) ABSTRACT

A propulsion system may include a cylindrical support member and a tubular rotatable member rotatably mounted within the support member that may be adapted to permit fluid flow therethrough. The tubular rotatable member may extend past a down stream end of the support member. An exemplary embodiment of a propulsion system may also disclose a vane attached on an interior surface of the tubular member and may include a blade which extends in a direction toward a rotational axis of the rotatable member such that rotation of the tubular member and the vane attached thereon draws fluid into the tubular member to accelerate the fluid flow through the tubular member. Additionally, a nozzle may be attached to the down stream end of the support member and include a primary nozzle and a secondary nozzle within the primary nozzle. The secondary nozzle may be engaged with the primary nozzle by a stator.

14 Claims, 5 Drawing Sheets

(51) Int. Cl.
  *B63H 11/08* (2006.01)
  *B63H 11/107* (2006.01)
  *B63H 1/16* (2006.01)
  *B63H 23/00* (2006.01)

(56) References Cited

U.S. PATENT DOCUMENTS

| | | | |
|---|---|---|---|
| 5,222,863 | A | 6/1993 | Jones |
| 5,383,802 | A | 1/1995 | Nicholson |
| 8,047,884 | B2 * | 11/2011 | Nicholson ............... 440/38 |
| 2003/0036318 | A1 | 2/2003 | Forest |
| 2007/0270056 | A1 | 11/2007 | Abdel-Maksoud et al. |

FOREIGN PATENT DOCUMENTS

| | | |
|---|---|---|
| WO | 2005/092702 A1 | 10/2005 |
| WO | 2007005209 | 1/2007 |

OTHER PUBLICATIONS

Second Chinese Office Action and Search Report, with English translation, issued in corresponding Chinese Patent Application No. 200880125998.0 on Jan. 16, 2013. 13 pages total.
The International Search Report for corresponding PCT Application No. PCT/US2008/003627 dated Sep. 22, 2008.
Supplementary European Search Report; dated May 21, 2014; from Corresponding European Patent Application No. 08727001.3; 8 pgs.

* cited by examiner

PROPULSION SYSTEM

CROSS REFERENCE APPLICATIONS

This application is a continuation-in-part of U.S. patent application Ser. No. 12/071,445, filed Feb. 21, 2008, which claims priority under 35 U.S.C. 119 (e) of U.S. Provisional Application No. 60/996,895, filed Dec. 10, 2007, the entire contents of which are hereby incorporated by reference their entireties.

BACKGROUND

In conventional propulsion systems, propellers perform the work required to accelerate fluid molecules to a desired velocity, but the propellers are unable to operate further on the fluid molecules to follow up on the work that was expended to overcome the initial inertia. This is due to the fact that a fluid molecule at rest tends to remain at rest and thus once placed in motion, a relatively smaller amount of energy is required to further accelerate it. Additionally, parts in conventional propulsion systems are easily damaged by foreign objects and unprotected screw-type propulsion systems pose a danger to divers and other living systems which pass in the vicinity of the propulsion system.

Those skilled in the art relating to propulsion systems have found that the propulsion efficiency of a propeller may be increased by carefully channeling the fluid flow to a propeller and similarly directing the accelerated fluid flow efficiently as it leaves the back of the propeller. In the past, various types of conical enclosures or nozzles have been fashioned in an attempt to increase the performance of propellers.

Essentially, a conical enclosure or nozzle surrounds the propeller in a longitudinal direction and directs fluid flow exiting from the propeller blades. The principles of fluid dynamics dictate that the volume of water flowing into the propeller will equal the volume of water flowing out. As such, the diameter of the nozzle is reduced as the water flows rearward and out of the nozzle. Since the volume of water exiting must equal the volume that enters the nozzle, the water flow accelerates as it travels through the nozzle and thereby provides additional thrust which cannot be achieved by the propeller alone.

SUMMARY

An exemplary embodiment of a propulsion system may disclose a cylindrical support member and a tubular rotatable member rotatably mounted within the support member that may be adapted to permit fluid flow there through. The tubular rotatable member may extend past a down stream end of the support member. An exemplary embodiment of a propulsion system may also disclose a vane attached on an interior surface of the tubular member and may include a blade which extends in a direction toward a rotational axis of the rotatable member such that rotation of the tubular member and the vane attached thereon draws fluid into the tubular member to accelerate the fluid flow through the tubular member. Additionally, a nozzle may be attached to the down stream end of the support member and include a primary nozzle and a secondary nozzle within the primary nozzle. The secondary nozzle may be engaged with the primary nozzle by a stator.

Another exemplary embodiment can disclose a propulsion system which may include a nozzle attached to a down stream end of a support member. The nozzle may include a primary nozzle and a secondary nozzle within the primary nozzle. The secondary nozzle may be engaged with the primary nozzle by a stator. The primary nozzle may define first, second and third sections extending along a longitudinal direction of the primary nozzle. The first section may extend in a direction that is substantially parallel to a central longitudinal axis of the nozzle, the second section may taper inwardly in a direction toward the central longitudinal axis and the third section may extend in a direction that is substantially parallel to the central longitudinal axis. Primary and secondary nozzles may be arranged to receive and direct accelerated water leaving final impeller blades into a space between an interior surface of the primary nozzle and an external surface of the interior nozzle. Internal surfaces of secondary nozzle may be arranged to accept a combined volume of slower-moving water or fluid not directly accelerated by impeller blades, and comprising a mixture of water vapor, fluid/water, and/or air, and, in its first section, can represent a low-pressure expansion chamber followed by a constriction in the second section which, aided by pressure from forward movement accelerates this combined flow backward, contributing to thrust.

BRIEF DESCRIPTION OF THE DRAWINGS

Advantages of embodiments of the propulsion system will be apparent from the following detailed description of the exemplary embodiments thereof, which description should be considered in conjunction with the accompanying drawings in which like numerals indicate like elements, in which.

DETAILED DESCRIPTION

Aspects of the propulsion system are disclosed in the following description and related drawings directed to specific embodiments of the propulsion system. Alternate embodiments may be devised without departing from the spirit or the scope of propulsion system. Additionally, well-known elements of exemplary embodiments of the propulsion system will not be described in detail or will be omitted so as not to obscure the relevant details of the propulsion system. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the propulsion system," or "exemplary embodiments," do not require that all embodiments of the propulsion system include the discussed feature, advantage or mode of operation.

Other examples of the below-described exemplary embodiments may be used or adapted to be used with U.S. Pat. No. 5,383,802 which is hereby incorporated by reference in its entirety.

Figure 1:
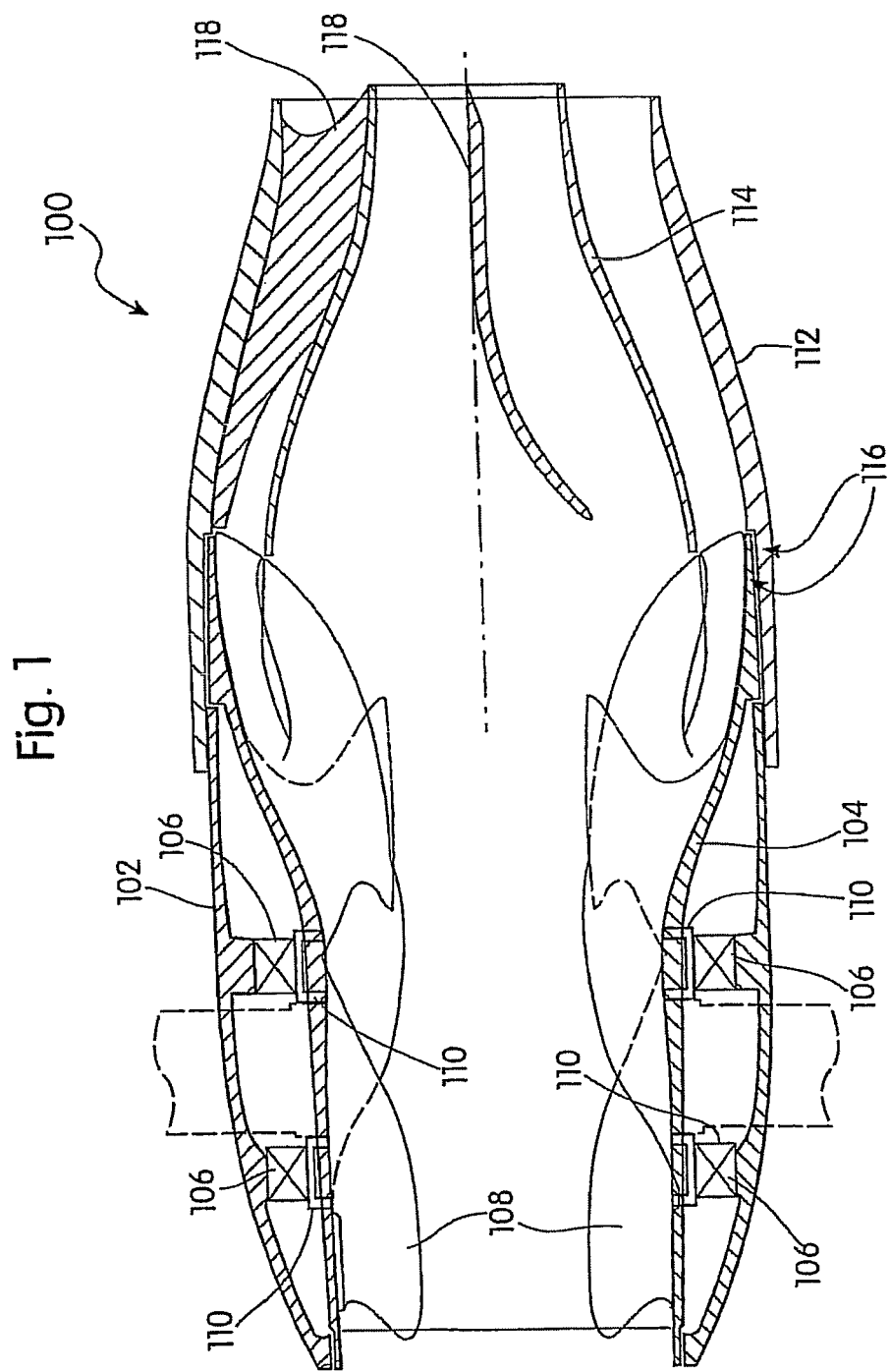
FIG. 1 is an exemplary cross-sectional longitudinal view of an exemplary embodiment of a propulsion system.

In an exemplary embodiment, as shown in FIG. 1, a propulsion system 100 may include an outer shell 102 having bearings 106 for supporting a rotor 104. Outer shell 102 may provide bearing support for rotor 104 and further provide ducting and streamlining for rotor 104. Rotor 104 may be hollow with vanes 108 extending from an interior surface of rotor 104 in the direction of the rotational axis of rotor 104. Rotor 104 may define first, second and third sections which may extend along a longitudinal direction of rotor 104. The first section of rotor 104, as seen in FIG. 1 beginning at the furthest up-stream location (the left-side as seen in FIG. 1), may be slightly tapered to provide a venturi effect so as to draw air into a fluid medium passing through rotor 104. In an exemplary embodiment where the first section inwardly tapers, the second section may begin at a point along rotor 104 where further restriction by the tapering first section would inhibit the fluid flow, however, the point at which the second section begins may not be limited to this point and may depend on design considerations. The second section may extend outwardly to a third section which may gradually return to a surface which may be parallel to the axis of rotation of rotor 104 at the exit of rotor 104, at a down-stream location.

Vanes 108 may extend from rotor 104 and the vane shapes when viewed in cross-section from a point perpendicular to the rotor's rotational axis may define an archimedes screw, but may change in angle of attack and loaded surface areas in proportions that roughly correspond to fluid speed and rotor diameter. The number of blade sections may depend on design considerations and can be less than or more than three.

The propulsion system may enhance efficiency due to air inducted into the fluid by natural venturi effects or vapor formed in areas of low pressure. The design may draw air and vapor into areas of low pressure that would normally allow vapor bubbles to form and collapse. In addition, energy lost due to turbulence at apices and trailing edges of vanes 108 may be decreased by dropping or holding a stream of entrained air and vapor in close proximity to (or impinging upon) areas of predicted low pressures. The rotor wall constriction in the first section rotor 104 may indirectly compress air and vapor admitted to high stress areas, effectively pre-loading higher-pressure air, gas or vapor into these regions. Consequently, potential regions of vapor formation and accumulation may be filled with gas, vapor, or air pockets. In typical operation, a low pressure area implies the expansion of gas or air to fill the anticipated vacuum, and, because low pressure phenomena may occur with steadily increasing frequency throughout the rear two thirds of the propulsion device, vapor tends to accumulate into even larger, stable, visible gas or air pockets suspended between the fast-moving outer ring of fluid that may be driven by vanes 108 and the slower moving inner core of fluid that may form around the axis of rotation of rotor 104 in the center area that may not be disturbed by vanes 108 due to increased pressure caused by flow constriction within the nozzle. This gaseous region may remain largely contained within the secondary nozzle 114.

In another exemplary embodiment, propulsion system 100 may utilize water lubricated bearings 106 and drive systems that may require cooling or heat removal/transfer systems. A gap 116 between the end of rotor 104 and a primary nozzle 112 may be adapted to provide a means of escape for high pressure water from the interior of rotor 104. This high pressure water may be directed through gap 116 into the space surrounding bearings 106 and could potentially surround components of a drive system or any other desired structure or components housed between outer shell 102 and rotor 104. This may provide a positive pressurized flow between moving and static surfaces. Gap 116 may vary in size for example, 0.25 inches, or any other desired gap size. Additionally, gap 116 may be expanded to release additional pressurized water or other desired fluid for use in cooling, for example, electric drives, internal combustion engines, or any other desired system requiring pressurized fluid.

In another exemplary embodiment, as seen in FIG. 1, ducts 110 may be formed in the side walls of rotor 104 at high and low pressure sides of vanes 108. Ducts 110 may introduce high pressure water to water-lubricated bearing interfaces. The high pressure water may enter ducts 110 on the high pressure side of vanes 108, cool and lubricate bearings 106 and then be reintroduced at the low pressure side of vanes 108 which may result in a closed loop cooling and lubrication system with substantially no volumetric loss of fluid passing through rotor 104. The pressure differential between the two openings of ducts 110 may provide a current of pressurized fluid, such as water, to any desired location outside of rotor 104. Ducts 110 may also be diverted to other desired tasks or locations which may result in a corresponding reduction of fluid pressure in the interior of rotor 104. The positioning of ducts 110 can be in any desired location through the walls of rotor 104 and be of any desired shape or size.

A further exemplary embodiment of a propulsion system 100, as seen in FIGS. 1-5, may include a primary nozzle 112, a secondary nozzle 114 and at least one stator 118, but may include any desired number of stators 118. Secondary nozzle 114 may be affixed within primary nozzle 112 by stators 118.

Primary nozzle 112 may be placed at a point of largest diameter of the interior of rotor 104 and may be mounted to outer shell 102, at a down-stream side, through welding or any other type of fastening mechanism that may provide a fluid tight seal between outer shell 102 and primary nozzle 112. The interface created by the attachment of primary nozzle 112 and outer shell 102 may approximate a continuous static interior surface with vanes 108 extending from rotor 104.

Down-stream from the attachment of primary nozzle 112 and outer shell 102, the interior of primary nozzle 112 may reduce in diameter which may induce a constriction or reduced cross-sectional area. The reduction in diameter of primary nozzle 112 may vary according to desired vectoring of the fluid flow through primary nozzle 112 and the desired increase in flow acceleration, for example, the angle of curvature of the primary nozzle 112 and secondary nozzle 114 may be between 15 and 30 degrees or any other desired angle of curvature. The constriction caused by primary nozzle 112 may induce acceleration in fluid flow and an increase in pressure on the fluid from the point of exiting the rotor 104 to the terminating downstream end of primary nozzle 112.

Secondary nozzle 114 may be positioned approximately at the apices of the inner edges of the furthest downstream vanes 108 and may also reduce in diameter at a rate of curvature equal or different than the rate of curvature of primary nozzle 112. The inner walls of secondary nozzle 114 may generally follow the contours or the outer walls of secondary nozzle 114 and may be configured to reduce flow disruption between the up stream side of the primary nozzle 112 and secondary nozzle 114 and the down stream side of the primary nozzle 112 and secondary nozzle 114. At least one stator 118, but may be as many as desired, may be mounted between the inner surface of primary nozzle 112 and the outer surface of secondary nozzle 114. Stator 118 may be used to maintain the spatial and static separation between primary nozzle 112 and secondary nozzle 114.

The separation between primary nozzle 112 and secondary nozzle 114 may provide a channel which may facilitate a physical separation between inner and outer streams of fluid.

In operation, as rotor 104 rotates, fluid may be forced through rotor 104 and into primary nozzle 112 and secondary nozzle 114. As rotor 104 rotates the fluid, for example water, may be separated into a liquid outer stream and a vapor inner stream. The outer liquid stream may be naturally forced outward against the inner walls of primary nozzle 112. Secondary nozzle 114 may be configured, as seen in FIG. 1, to allow gaseous expansion from rotor 104 and vanes 108 at the upstream side and then facilitate acceleration of the vapor and gas by the reduction in diameter of secondary nozzle 114 at the downstream side. Thus the channel between primary nozzle 112 and secondary nozzle 114 may facilitate the flow of the liquid portion of the fluid flow and secondary nozzle 114 may facilitate the flow of the vapor portion of the fluid flow.

Stators 118 may impinge on fluid flow exiting rotor 104 and direct fluid flow downstream of primary nozzle 112 and secondary nozzle 114. Stators 118 may be mounted at locations immediately downstream from vanes 108 and may be formed at the upstream side with an angle of attack that may approximate the angle of vanes 118 at the downstream side of rotor 104. Stators 118 may gradually decrease in angle of attack, eventually aligning in parallel with the axis of rotation of rotor 104 and the longitudinal axis of primary nozzle 112. This formation of stators 118 may aid in altering the velocity vector of the exiting fluid, forcing the fluid to exit the primary 112 and secondary nozzles 114 to exit parallel to the axis of rotation of rotor 104, in such a way that may increase the potential and actual thrust of the overall propulsion system 100.

The separation of the vapor and liquid flow by primary nozzle 112 and secondary nozzle 114 may attribute to an increased thrust of rotor 104. Adding primary nozzle 112 and secondary nozzle 114 to rotor 104 may produce a 400 percent increase in thrust when compared to the thrust of rotor 104 alone. This increase in thrust may also be attributed to the containment of radially centrifuged high pressure liquid and the separation and pressurization of internally generated vapor flow. The percent increase in thrust may increase or decrease depending on, for example, the rate of curvature of primary nozzle 112 and secondary nozzle 114.

In another exemplary embodiment, as seen in FIGS. 2-5, primary nozzle 112 may include steering ports 201 and braking ports 207, each of which creates an opening through the wall of primary nozzle 112. Each steering port 201 may be coupled with a corresponding steering port flap 200. Steering ports 201 may be located at any desired position on primary nozzle 112 and, for example, may be located on the first 20 percent of the upstream side of primary nozzle 112. Additionally, steering ports 201 and corresponding steering port flaps 200 may, for example, be symmetrically or asymmetrically oriented around the periphery of primary nozzle and may be formed in any desirable shape or configuration. Steering ports 201 and corresponding steering port flaps 200 may also be located on the first 20% of the upstream portion of primary nozzle 112, the first half of the upstream portion of the primary nozzle 112 or at any other desired location over the entire length of primary nozzle 112.

Figure 2:
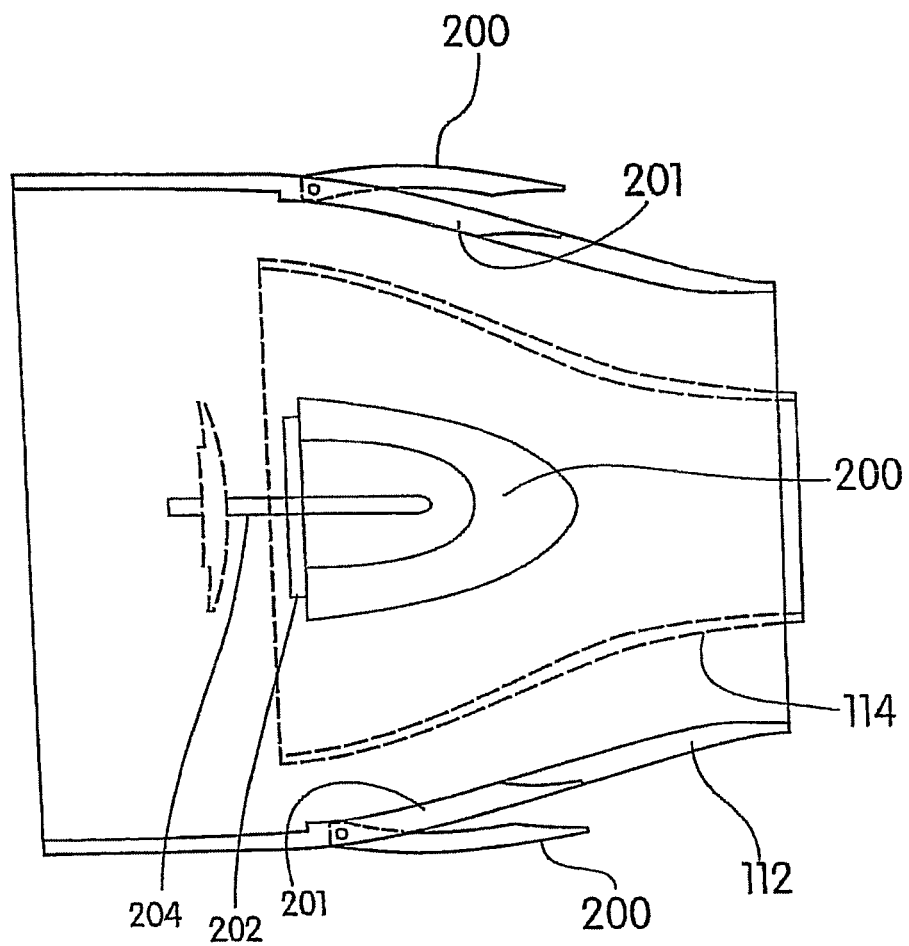
FIG. 2 is an exemplary side view of an exemplary embodiment of a nozzle of a propulsion system.

Steering port flaps 200 may be formed to seal steering ports 201 when placed in a closed position. Steering port flaps 200 may have a hinge 202 or be otherwise attached at an upstream position with respect to primary nozzle 112, as can be seen in FIG. 2. The number of steering ports 201 and corresponding steering port flaps 200 may range from a single steering port 201 and corresponding steering port flap 200 to as many as desired.

Figure 4B:
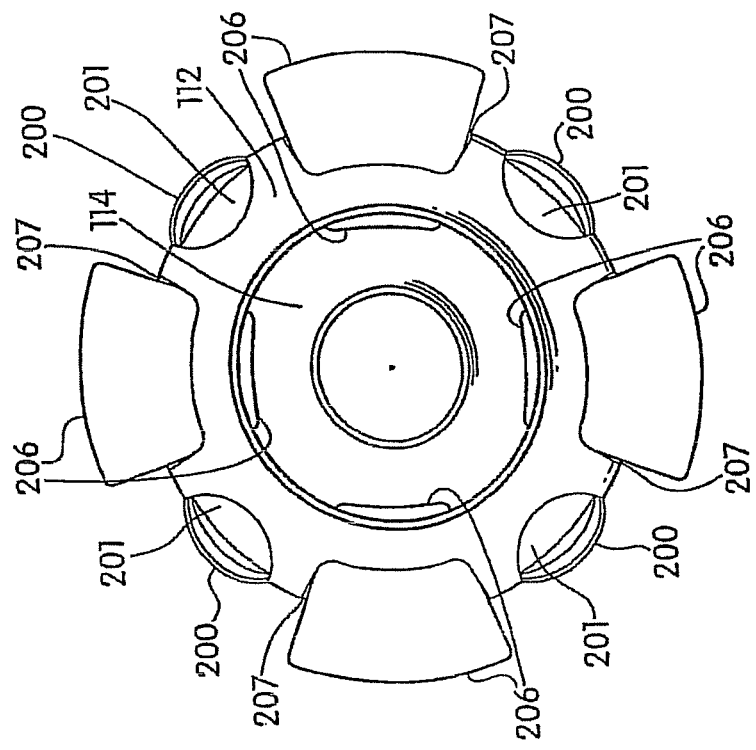
FIG. 4b is an exemplary downstream view of an exemplary embodiment of a nozzle of a propulsion system in a fully engaged position.
Figure 4A:
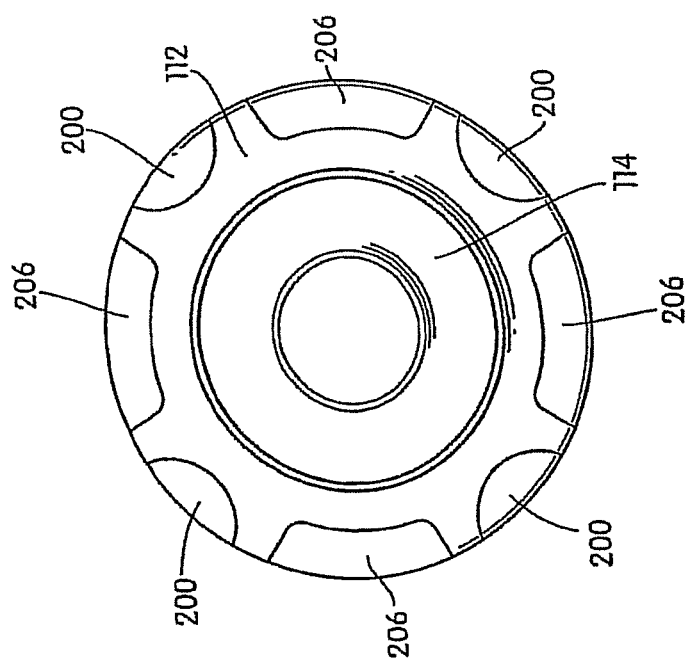
FIG. 4a is an exemplary downstream view of an exemplary embodiment of a nozzle of a propulsion system in an unengaged position.
Figure 5:
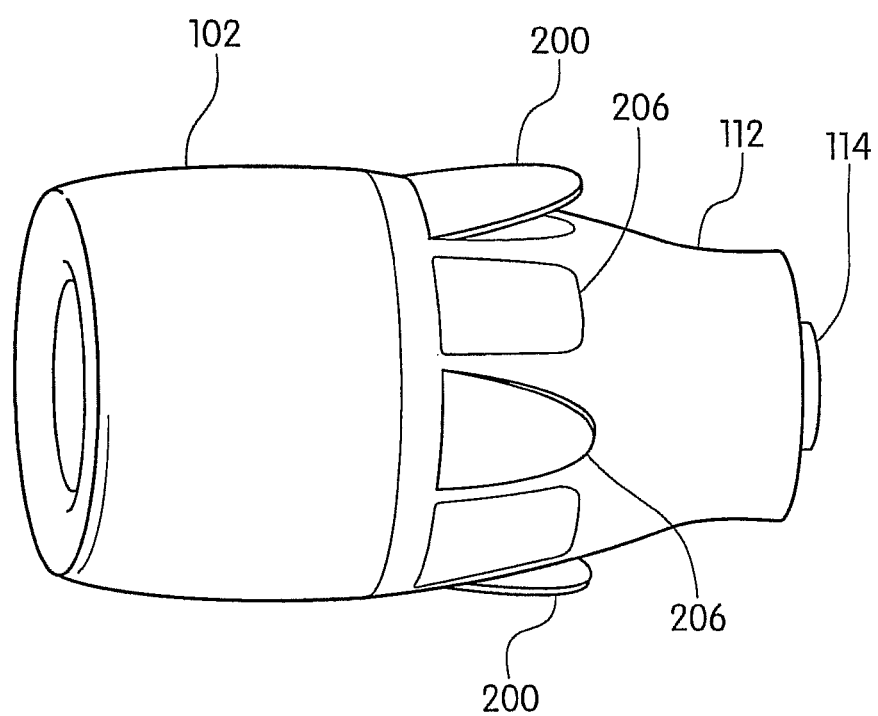
FIG. 5 is an exemplary side view of an exemplary embodiment of a propulsion system.

In another exemplary embodiment, as seen in FIGS. 4a-5, hinges 202 may facilitate opening steering port flaps 200 in such a way that fluid flow may exit primary nozzle 112 at an angle that may be less than or equal to 90 degrees from the direction of the downstream exit of primary nozzle 112. Steering port flaps 200 may be incrementally opened, thus diverting select amounts of fluid flow from the inside of primary nozzle 112 through steering ports 201. As fluid flow is diverted through selected steering ports 201, the diverted flow may alter the velocity vector of the overall fluid exiting primary nozzle 112, thus providing a means of adjusting the direction of the thrust of nozzle 112.

Figure 3:
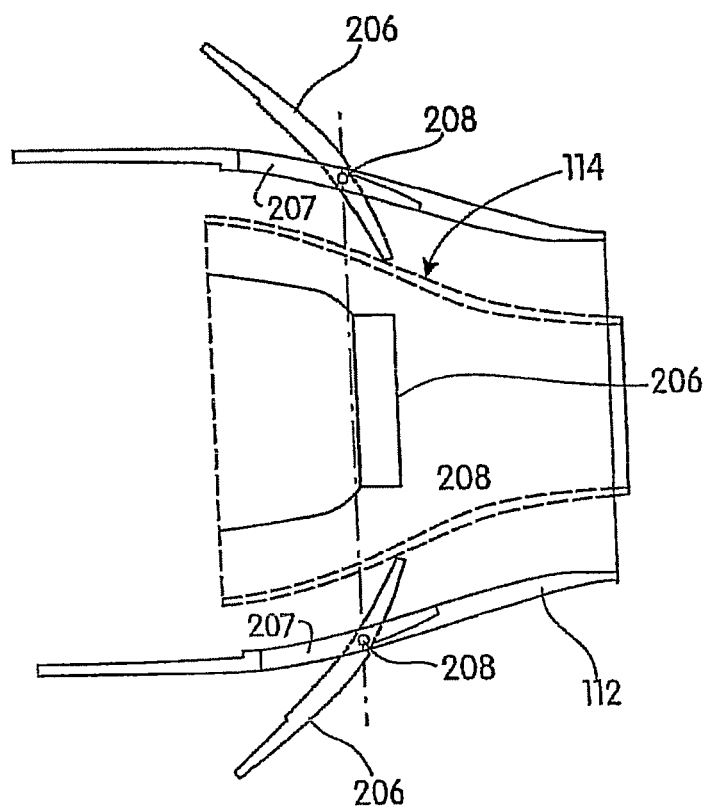
FIG. 3 is another exemplary side view of an exemplary embodiment of a nozzle of a propulsion system.

In a further exemplary embodiment, as seen in FIG. 3, each braking port 207 may be coupled with a corresponding braking port flap 206. Braking ports 207 may be located at any desired position on primary nozzle 112 and, for example, may be located on the first 20 percent of the up stream side of primary nozzle 112. Additionally, braking ports 207 and corresponding braking port flaps 206 may, for example, be symmetrically oriented around the periphery of primary nozzle and may be formed in any desired shape or configuration. Braking ports 207 and corresponding braking port flaps 206 may also be located on the first 20% of the upstream portion of primary nozzle 112, the first half of the upstream portion of the primary nozzle 112 or at any other desired location over the entire length of primary nozzle 112.

Braking port flaps 206 may be formed to seal braking ports 207 when placed in a closed position. Braking port flaps 206 may have a hinge 208 or be otherwise attached at a downstream position with respect to primary nozzle 112, as can be seen in FIG. 3. The number of braking ports 207 and corresponding braking port flaps 206 may range from a single braking port 207 and corresponding braking port flap 206 to as many as desired.

In a further exemplary embodiment, as seen in FIGS. 4a-5, hinges 208 may facilitate opening braking port flaps 206 in such a way that an upstream portion of braking flap 206 may be opened externally to primary nozzle 112 and a downstream portion may extend internally into primary nozzle 112. The downstream portion of braking flap 206 may act as a partial valve, restricting a portion of fluid flow from exiting primary nozzle 112 between secondary nozzle 114 and primary nozzle 112. The upstream portion of braking port flap 206 may open from an upstream side of braking port 207 and may force a portion of the fluid flow from primary nozzle 112 to be diverted out of primary nozzle 112 at an angle that may be between 90 and 180 degrees from the direction of the downstream exit of primary nozzle 112. Braking port flaps 206 may be incrementally opened, thus diverting a select amount of fluid flow from the inside of primary nozzle 112 through braking ports 207.

As fluid flow is diverted through selected braking ports 207, the diverted flow may be directed in a generally opposite direction of the overall fluid exiting primary nozzle 112, thus reducing the velocity vector of the overall fluid exiting primary nozzle 112, and acting as a braking mechanism for propulsion system 100, during use. Additionally, the upstream portion of braking port flap 206 may act as a drag on propulsion system 100 when opened. The amount of drag created by the braking port flap 206 may be directly correlated to the amount braking port flap 206 is opened and may add to the braking ability of propulsion system 100.

In another exemplary embodiment, steering port flaps 200 and braking port flaps 206 may be utilized in directional control of propulsion system 100, as seen in FIGS. 2-5. Any combination of opening and closing steering port flaps 200 may divert fluid flow and thrust away from the downstream side of primary nozzle 112 at different variable angles, which may be used to facilitate steering or adjusting the trim of the propulsion system 100. Any combination of opening and closing braking port flaps 206 may divert fluid flow in an opposite direction from the fluid flow exiting the downstream side of secondary nozzle 114, thus reducing or breaking the thrust vector of the fluid flow exiting the downstream side of secondary nozzle 114. This braking system may, therefore, not necessitate closing off the downstream side of either the primary nozzle 112 or the secondary nozzle 114. Hard or extreme steering may, for example, require a combination of opening and closing specific steering port flaps 200 and braking port flaps 206.

In a further exemplary embodiment, opening and closing steering port flaps 200 and braking port flaps 206 may be accomplished by a mechanical release mechanism. For example, rod 204 may mate with a groove on steering flap 200, as seen in FIG. 2, and may be retracted in the direction of hinge 202 as a means of releasing steering flap 200 and allowing fluid flow from within nozzle 112 to escape through steering port 201. This rod 104 and groove mechanism may be used to incrementally control the opening and closing of both steering port flaps 200 and braking port flaps 206. Hinges 202 and 208 may also be spring loaded or otherwise biased toward an open or closed position as an additional means of facilitating the opening of both steering port flaps 200 and braking port flaps 206.

Additionally, for example, opening and closing steering port flaps 200 and braking port flaps 206 may be accomplished via magnetic servos, control wires, piezoelectric mechanisms or any other mechanical, electrical or magnetic devices capable of incrementally opening and closing both steering port flaps 200 and braking port flaps 206. Control systems may also be employed to communicate with and control the opening and closing devices, mentioned previously, in order to open or close steering port flaps 200 and braking port flaps 206 from a remote location.

The foregoing description and accompanying drawings illustrate the principles, preferred embodiments and modes of operation of the invention. However, the permit application and issuance system should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the permit application and issuance system as defined by the following claims.

What is claimed is:

1. A propulsion system comprising:
a cylindrical support member and a tubular rotatable member rotatably mounted within the support member and being adapted to permit a fluid flow therethrough, wherein the tubular rotatable member extends past a down stream end of the support member; and
a nozzle attached to the down stream end of the support member;
the nozzle including a primary nozzle and a secondary nozzle within the primary nozzle; and
the secondary nozzle being engaged with the primary nozzle by at least one stator,
wherein the primary nozzle includes a plurality of openings substantially perpendicular to a rotational axis wherein each of the plurality of openings includes a corresponding flap capable of fluidically sealing the corresponding opening closed.

2. A propulsion system according to claim 1, wherein the primary nozzle defines a first, second and third sections extending along a longitudinal direction of the primary nozzle, the first section extending in a direction that is substantially parallel to the rotational axis, the second section tapering inwardly in a direction toward the rotational axis and the third section extending in a direction that is substantially parallel to the rotational axis.

3. A propulsion system according to claim 1, wherein each of the flaps includes a hinge adapted to provide for the opening and closing of the flap over the corresponding opening.

4. A propulsion system according to claim 3, wherein at least one of the flaps is hinged at an upstream side of the flap.

5. A propulsion system according to claim 3, wherein at least one of the flaps is hinged at a downstream side of the flap.

6. A propulsion system according to claim 5, wherein the at least one flap hinged at a down stream side of the flap provides a block between the primary and secondary nozzle when in an open position uncovering the corresponding opening.

7. A propulsion system according to claim 1, further comprising:
a bearing, including a bearing race, engaged between the support member and the rotatable member;
a channel formed in the rotatable member having an inlet and an outlet fluidically communicative with the fluid flow, wherein the channel is fluidically communicative with the bearing.

8. A propulsion system according to claim 7, wherein the inlet of the channel is located upstream from the outlet of the channel.

9. A propulsion system comprising:
a nozzle attached to a down stream end of a support member;
the nozzle includes a primary nozzle and a secondary nozzle within the primary nozzle; and
the secondary nozzle is engaged with the primary nozzle by at least one stator;
wherein the at least one stator defines first and second sections, the first stator section having a substantially arcuate shape extending in a substantially longitudinal direction with respect to the nozzle and the second stator section extending in a direction that is substantially parallel to a central longitudinal axis of the nozzle,
wherein the primary nozzle includes a plurality of openings substantially perpendicular to a rotational axis wherein each of the plurality of openings includes a corresponding flap capable of fluidically sealing the corresponding opening closed.

10. A propulsion system according to claim 9, wherein the primary nozzle defining a first, second and third sections extending along a longitudinal direction of the primary nozzle, the first section extending in a direction that is substantially parallel to the central longitudinal axis of the nozzle, the second section tapering inwardly in a direction toward the central longitudinal axis and the third section extending in a direction that is substantially parallel to the central longitudinal axis.

11. A propulsion system according to claim 9, wherein each of the flaps includes a hinge adapted to provide for the opening and closing of the flap over the corresponding opening.

12. A propulsion system according to claim 11, wherein at least one of the flaps is hinged at an upstream side of the flap.

13. A propulsion system according to claim 11, wherein at least one of the flaps is hinged at a downstream side of the flap.

14. A propulsion system according to claim 13, wherein the at least one flap hinged at a down stream side of the flap provides a block between the primary and secondary nozzle when in an open position uncovering the corresponding opening.

\* \* \* \* \*